United States Patent
Xu et al.

(10) Patent No.: US 11,109,545 B2
(45) Date of Patent: Sep. 7, 2021

(54) HIGH-PRESSURE WATER MIST ECOLOGICAL CULTIVATION SYSTEM

(71) Applicant: ZHENGZHOU HAILITE AGRICULTURE AND FORESTRY SCIENCE AND TECHNOLOGY CO., LTD., Zhengzhou (CN)

(72) Inventors: Zhiyuan Xu, Zhengzhou (CN); Zexiong Hu, Zhengzhou (CN); Qidong Xu, Zhengzhou (CN)

(73) Assignee: ZHENGZHOU HAILITE AGRICULTURE AND FORESTRY SCIENCE AND TECHNOLOGY CO., LTD., Zhengzhou (CN)

( * ) Notice: Subject to any disclaimer, the term of this patent is extended or adjusted under 35 U.S.C. 154(b) by 633 days.

(21) Appl. No.: 15/774,392

(22) PCT Filed: Dec. 27, 2016

(86) PCT No.: PCT/CN2016/112226
§ 371 (c)(1),
(2) Date: May 8, 2018

(87) PCT Pub. No.: WO2017/206500
PCT Pub. Date: Dec. 7, 2017

(65) Prior Publication Data
US 2020/0245573 A1    Aug. 6, 2020

(30) Foreign Application Priority Data

| May 31, 2016 | (CN) | 201610374171.X |
| Jul. 6, 2016 | (CN) | 201610526471.5 |
| Aug. 11, 2016 | (CN) | 201610655834.5 |

(51) Int. Cl.
*A01G 25/16* (2006.01)
*A01G 31/06* (2006.01)
(Continued)

(52) U.S. Cl.
CPC ............ *A01G 25/16* (2013.01); *A01G 24/10* (2018.02); *A01G 31/06* (2013.01); *A01G 2031/006* (2013.01)

(58) Field of Classification Search
CPC .. A01G 31/06; A01G 2031/006; A01G 31/02; A01G 31/00; A01G 25/16;
(Continued)

(56) References Cited

U.S. PATENT DOCUMENTS

| 4,163,342 A  | * | 8/1979  | Fogg    | A01G 31/04  |
|              |   |         |         | 47/58.1 R   |
| 8,197,664 B2 | * | 6/2012  | Murahara | C01D 1/40  |
|              |   |         |         | 205/516     |
| 2015/0282444 A1 | * | 10/2015 | Butler | A01G 31/02 |
|              |   |         |         | 47/62 C     |

FOREIGN PATENT DOCUMENTS

| CN | 201430824 Y | 3/2010 |
| CN | 101940152 A | 1/2011 |

(Continued)

OTHER PUBLICATIONS

Chinese Search Report dated May 3, 2018, in connection with corresponding CN Application No. 201610374171X.
(Continued)

*Primary Examiner* — Kathleen I Alker
(74) *Attorney, Agent, or Firm* — Maier & Maier, PLLC

(57) ABSTRACT

An ecological cultivation system with a high pressure fine water mist. A nutrient solution supply system and a cultivation frame, a root of a crop seedling being wrapped within a planting sponge body, a planting sponge body being fixed on the cultivation frame, a nutrient solution supply system including a nutrient solution storage tank, a filter, a magnetizer, a low pressure ball valve, a high pressure pump, a high pressure ball valve, and a high-pressure fine water mist sprayer, a liquid outlet of a nutrient solution storage tank
(Continued)

being connected to a water inlet of the high pressure pump by a filter, a magnetizer, and the low pressure ball valve being connected in series, and a water outlet of the high pressure pump being connected by the high pressure ball valve, to the high-pressure fine water mist sprayer provided within the cultivation frame.

5 Claims, 12 Drawing Sheets

(51) Int. Cl.
*A01G 24/10* (2018.01)
*A01G 31/00* (2018.01)

(58) Field of Classification Search
CPC .. A01G 25/162; A01G 25/165; A01G 25/167; A01G 24/10
See application file for complete search history.

(56) References Cited

FOREIGN PATENT DOCUMENTS

| | | | | | |
|---|---|---|---|---|---|
| CN | 101940152 | A | * | 1/2011 | ............. Y02P 60/21 |
| CN | 202160491 | U | | 3/2012 | |
| CN | 202907577 | U | * | 5/2013 | ............. Y02P 60/21 |
| CN | 202907577 | U | | 5/2013 | |
| CN | 103416292 | A | * | 12/2013 | ............. A01G 31/06 |
| CN | 103639085 | A | | 3/2014 | |
| CN | 104396698 | A | | 3/2015 | |
| CN | 104472336 | A | * | 4/2015 | ............. A01G 31/02 |
| CN | 104584988 | A | * | 5/2015 | ............. A01G 9/247 |
| CN | 105165323 | A | * | 12/2015 | ............... C05B 7/00 |
| CN | 105230448 | A | * | 1/2016 | ........... A01G 25/167 |
| CN | 105830902 | A | | 8/2016 | |
| CN | 106069710 | A | | 11/2016 | |
| EP | 0276354 | A1 | | 8/1988 | |
| ES | 2350349 | A1 | * | 1/2011 | ............. A01G 9/025 |
| FI | 881799 | A | | 10/1988 | |
| GB | 2 026 827 | A | | 2/1980 | |
| KR | 20080098945 | A | * | 11/2008 | ............. A01G 31/02 |

OTHER PUBLICATIONS

International Search Report dated Feb. 23, 2017, in connection with corresponding International Application No. PCT/CN2016/112226 (7 pp., including machine-generated English translation).
Written Opinion of the International Searching Authority dated Feb. 23, 2017, in connection with corresponding International Application No. PCT/CN2016/112226 (12 pp., including machine-generated English translation).
Chinese Office Action dated May 3, 2018, in connection with corresponding CN Application No. 201610374171.X (15 pp., including machine-generated English translation).
Chinese Office Action dated Oct. 15, 2018, in connection with corresponding CN Application No. 201610374171.X (11 pp., including machine-generated English translation).
Israel Office Action dated Aug. 4, 2019, in connection with corresponding IL Application No. 258646 (5 pp., including machine-generated English translation).
Israel Office Action dated Mar. 15, 2021, in connection with corresponding IL Application No. 258646 (6 pp., including machine-generated English translation).

* cited by examiner ns: (1) No. 201610374171.X filed on May 31, 2016, entitled "High-pressure Water Mist Ecological System"; (2) No. 201610526471.5 filed on Jul. 6, 2016, entitled "Modular Cultivation Rack for Aeroponic of Solanaceous crops"; and (3) No. 201610655834.5 filed on Aug. 11, 2016, entitled "Cultivation System of Leaf Vegetables", all of which are incorporated herein in their entirety.

FIELD

The present disclosure relates to the field of ecological cultivation by nutrition solution, and particularly to a high-pressure water mist ecological cultivation system.

BACKGROUND

The population of China occupies ¼ of the world population, but the area of arable land is only ⅐ of the total arable land worldwide, and the per capita area of arable land is far lower than the average level in the world. Moreover, China is a country that is rather poor in water resources, and is listed as one of the 13 water deficient countries in the world. The per capita water resource of China is only ¼ of the average per capita level worldwide, and the agricultural shortage of water is 30 billion cubic meters annually. In order to enhance the crop yield, traditional agriculture will apply a large amount of chemical fertilizers and agricultural chemicals. According to an introduction by Cornell University, the agricultural chemicals used worldwide are more than 6 million tons per annum; while only 1% thereof actually exert the effect, and the rest of 99% are dispersed in soils, air, and water, resulting in pollution of soils, water, and atmosphere, and the agricultural chemicals eventually enter the human bodies with drinking water and foodstuff, and further harm the human bodies. According to the investigation by Chinese Academy of Sciences, currently in China, at least 190-240 million acres of arable land is suffering from pollution of agricultural chemicals, and ⅕ of the arable land is suffering from pollution of heavy metals.

On the one hand, with the deep development of reform and opening-up and constant improvement on people's living standard, the production of crops, particularly vegetables and fruits, has been developed from the pure pursuit of high yield in the past towards high yield and high quality. People's demand for harmless and green food becomes increasingly popular. In order to maintain sustained development of economy of China and constant improvement on people's living standard, the production efficiency of limited areas of land has to be constantly improved, the space for agricultural production should be expanded, the utilization efficiency of water resources and the like should be enhanced, and the agricultural chemical residue should be eradicated.

On the other hand, with the development of agricultural high-tech ecological cultivation technologies, aeroponics for plants are widely used, which further puts forwards higher requirements for plant cultivation in aspects like nutrition supply and water supply. It requires a nutrient solution to cultivate a root system of a plant in a manner of mist, so as to make the root system of the plant flourish and enhance the yield. Although the conventional structures and characteristics also can realize such function of aeroponics, it is still far from satisfying the requirements for high quality and high yield of plants. Additionally, the conventional cultivation ranks, lacking standard components, is processed by soldering on the working site, and it is relatively difficult to be transported after the processing. Further, due to the limitation of worker's skills, it is difficult to ensure a consistent scale for each cultivation rank, while the discrepancies of ranks in dimension would easily affect the fixed connection between a cultivation board and the cultivation rank, and would affect the overall arrangement of the cultivation area, which will waste the effort and time and lead to a low efficiency in plant culturing. Therefore, it is imperative for an improvement and innovation.

SUMMARY

In view of the situations above, and in order to overcome the deficiencies in the prior art, an object of the present disclosure is to provide a high-pressure water mist ecological cultivation system, which can effectively solve the problems of water mist cultivation.

One technical solution of the present disclosure is as follows: a high-pressure water mist ecological cultivation system, comprising a nutrient solution supply system and a cultivation rank, wherein a root of a crop seedling is wrapped in a planting sponge body, the planting sponge body is fixed on the cultivation rank, the nutrient solution supply system comprises a nutrient solution storage tank, a filter, a magnetizer, a low-pressure ball valve, a high-pressure pump, a high-pressure ball valve and a high-pressure water mist spraying head, a solution outlet of the nutrient solution storage tank is connected to a water inlet of the high-pressure pump via the filter, the magnetizer and the low-pressure ball valve in series connection, a water outlet of the high-pressure pump is connected to the high-pressure water mist spraying head placed in the cultivation rank via the high-pressure ball valve, a nutrient solution stored in the nutrient solution storage tank is firstly filtered by the filter and magnetized by the magnetizer, and is then delivered by the high-pressure pump to the high-pressure water mist spraying head to be nebulized and subsequently sprayed, and the nebulized nutrient solution is delivered into the cultivation rank, mist particles have a diameter of 1-100 μm and strong diffusibility, a mist flow has certain motility and entrains air, to directly make a gaseous liquid be in direct contact with the root of the crop seedling and supply necessary nutrients to the crop seedling.

The above high-pressure water mist ecological cultivation system of the present disclosure is novel and unique in structure, simple and reasonable, and is easy to manufacture and operate. The roots of crop seedlings are exposed in the interior of the cultivation rank, and the nutrient solution is nebulized by the nutrient solution supply system into micrometer-scale mist droplets with a diameter of mist particles being 1-100 μm, the mist particles are directly sprayed onto the plant roots to supply the moisture and nutrient required by the growth of the plants, the plant roots are directly in contact with the air, which is the best form for solving a water-gas contradiction for roots among all the soilless cultivation technologies, there is no resistance for plant growth and the roots are well-flourished, which considerably improves the yield of crops, meanwhile, it is also easy for automatic control and stereo cultivation, and increasing the utilization rate of greenhouse space. The present disclosure is green, water-saving, fertilizer-saving, land-saving, high in yield, and environmentally friendly, and saves a lot of labors, and it is easy to use and has good effects, and is an innovation to the plant cultivation device.

Another technical solution of the present disclosure is as follows: a high-pressure water mist ecological cultivation system, comprising a water processing device, a nutrient solution supply system assembly, a cultivation rank assembly, a nutrient solution back-flow system assembly and a control cabinet, wherein the nutrient solution supply system assembly pressurizes a nutrient solution and then delivers the same to the cultivation rank assembly, the cultivation rank assembly plants and cultivates a crop seedling, and the nutrient solution back-flow system assembly recovers the nutrient solution that is not absorbed by the crop seedling for recycled use. The control cabinet is a supporting electric control cabinet that supplies power to the high-pressure water mist ecological cultivation system and controls the same.

In the another high-pressure water mist ecological cultivation system, the nutrient solution is nebulized into micrometer-scale mist droplets by the high-pressure water mist spraying device, and sprayed in a manner of intermittent mist to the root environment of plants to supply the necessary nutrient, such that the roots of plants are kept in an oxygen-rich high-moisture mist environment for high-efficiency metabolism of aerobic respiration, the roots will rapidly grow and divide without any resistance, and rapidly form large and flourished roots with extremely high respiratory capability, more sufficient bio-energies are provided for root absorption, and the growth potential is maximized, such that the growth and development of entire plants are promoted and the yield is considerably improved.

Yet another technical solution of the present disclosure is a leaf vegetable cultivation system, characterized in that the cultivation system comprises a nutrient solution supply system and a leaf vegetable cultivation rank, the leaf vegetable cultivation rank is formed by assembling a plurality of basic units, each basic unit comprises a base and a supporting rank provided on the base, the supporting rank is in an "A" shape formed by a left slant support, a right slant support and a transverse support, wherein the left slant support and the right slant support are joined to one another at one end, and the transverse duct support is transversely installed between the two slant supports, the supporting ranks are provided symmetrically in two, and the two supporting ranks are fixedly connected by a connection support across tops therebetween, the left slant supports and the right slant supports of the two supporting ranks are provided thereon with a foam cultivation plate, the base underneath the foam cultivation plate is provided thereon with a bottom seal formed by a PEP agricultural black-white film, the bottom seal and the foam cultivation plates on two sides collectively define a mist spraying space for the root of leaf vegetable, the nutrient solution supply system comprises a nutrient solution storage tank, a filter, a magnetizer, a low-pressure ball valve, a high-pressure pump, a high-pressure ball valve and a high-pressure water mist spraying head, a solution outlet of the nutrient solution storage tank is connected to a water inlet of the high-pressure pump via the filter, the magnetizer and the low-pressure ball valve in series connection, a water outlet of the high-pressure pump is connected to inlets of a plurality of mist spraying ducts via the high-pressure ball valve, the mist spraying duct extends into the mist spraying space of each basic unit, the extended portion of the mist spraying ducts is provided thereon with a plurality of the high-pressure water mist spraying heads), which form nebulizing structures for the nutrient solution.

This cultivation system is novel and unique in structure, simple and reasonable, and is easy to manufacture and convenient to transport; it can be assembled quickly for overall arrangement in the cultivation areas, and saves labor and time; it not only reduces the cost, but also demonstrates more remarkable advantages in improving the plant cultivation efficiency; it bypasses land—the conventional agricultural cultivation medium, and delivers the nutriment (water solution) as required by the growth of leaf vegetables to the roots of vegetables in the form of mist. The mist is high in flow rate, high in density, uniform in mist flow, wide in coverage, high in turbulent extent and high in air entrainment capability, and the requirements of roots for air, moisture, and nutrient can be simultaneously met; a mist particle is 1-100 μm in diameter, which can improve the absorption efficiency of leaf vegetables for nutrient; it has advantages such as saving water, fertilizer, land, and energy, being environmentally friendly, clean, and safe, requiring low investment, low cost, and less labor, easy operation, and high yield and good quality of the products; it is convenient to use and has a good effect, and has excellent social and economic benefits.

REFERENCE SIGNS

1—nutrient solution storage tank; 2—root; 3—filter; 4—magnetizer; 5—first pressure sensor; 6—low-pressure ball valve; 7—high-pressure pump; 8—second pressure sensor; 9—high-pressure ball valve; 10—high-pressure water mist spraying head; 11—overflow aperture; 12—aeroponic cultivation rank; 13—bracket; 14—planting sponge body; 15—crop seedling; 16—pressure regulation valve;

21—nutrient solution supply system assembly; 211—pressure controller; 212—nutrient solution storage tank; 213—water supplement booster pump; 214—filter; 215—high-pressure pump set; 216—overflow valve; 217—magnetized water device; 218—first duct; 219—pressure gauge; 2110—second duct; 2111—pressure controller; 2112-1, 2112-2, 2112-3 . . . 2112-N—partition control valves;

22—cultivation rank assembly; 221-1, 221-2 . . . 221-N—cultivation ranks; 222—nutrient solution delivery duct; 2221-1, 2221-2 . . . 2221-N—water inlet duct; 2222—backflow main duct; 2222-1, 2222-2 . . . 2222-N—nutrient solution back-flow ducts; 223—super fine water mist spraying head;

23—nutrient solution back-flow system assembly; 231—liquid level switch; 232—nutrient solution back-flow tank; 233—nutrient solution supplement pump; 234—supplement solution filter; 235—main delivery duct; 236—UV sterilizer;

31—nutrient solution storage tank; 32—mist spraying duct; 33—filter; 34—magnetizer; 35—first pressure sensor; 36—low-pressure ball valve; 37—high-pressure pump; 38—second pressure sensor; 39—high-pressure ball valve; 310—pressure regulation valve; 311—high-pressure water mist spraying head; 311a—first water mist spraying head; 311b—second water mist spraying head; 312—supporting frame; 313—bottom plate support; 314—supporting leg; 315—connection plate; 316—side support; 317—lapping support; 317a—clamping slot; 318—left slant support; 319—right slant support; 320—fastener; 321—connection support; 322—transverse duct support; 323—foam cultivation plate; 324—PEP agricultural black-white film; 324a—nutrient solution back-flow aperture; 325—mist spraying space; 326—slant branch duct; 327—vertical branch duct;

41—baseplate; 42—connection support; 43—left slant support; 44—right slant support; 45—fastener; 46—transverse support; 47—bottom plate support; 48—connection plate; 49—supporting leg; 410—supporting frame; 411—lapping support; 411a—clamping slot; 411b—fixing aperture; 412—side support; 413—cultivation aperture; 414—bottom supporting plate; 415—planting cup.

DETAILED DESCRIPTION

Embodiments of the present disclosure will be further described in detail hereinafter in combination with the drawings.

Example 1

Figure 1:
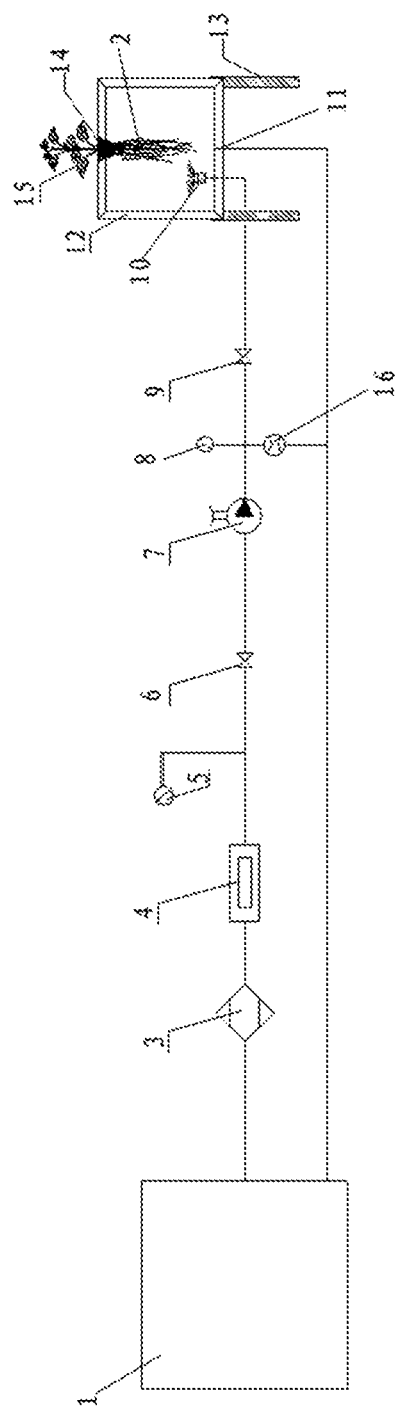
FIG. 1 is a structural schematic view of a high-pressure water mist ecological cultivation system of the present disclosure.

As shown in FIG. 1, a high-pressure water mist ecological cultivation system of the present disclosure includes a nutrient solution supply system and an aeroponic cultivation rank 12, in which roots 2 of a crop seedling 15 are wrapped inside a planting sponge body 14, the planting sponge body 14 is fixed on the aeroponic cultivation rank 12, a nutrient solution supply system includes a nutrient solution storage tank 1, a filter 3, a magnetizer 4, a low-pressure ball valve 6, a high-pressure pump 7, a high-pressure ball valve 9 and a high-pressure water mist spraying head 10; a solution outlet of the nutrient solution storage tank 1 is connected to a water inlet of the high-pressure pump 7 via the filter 3, the magnetizer 4 and the low-pressure ball valve 6 in series connection, a water outlet of the high-pressure pump 7 is connected to the high-pressure water mist spraying head 10 placed in the aeroponic cultivation rank 12 via the high-pressure ball valve 9, a nutrient solution stored in the nutrient solution storage tank 1 is firstly filtered by the filter 3 and magnetized by the magnetizer 4, and is then delivered by the high-pressure pump 7 to the high-pressure water mist spraying head 10 to be nebulized and subsequently sprayed, and the nebulized nutrient solution is delivered into the aeroponic cultivation rank 12. The mist particles, with a diameter of 1-100 μm, have strong diffusibility, and the mist flow has certain motility and entrains air, to directly make the gaseous liquid be in direct contact with the roots of the crop seedling, and supply necessary nutrients to the crop seedling.

To ensure the use effect, a first pressure sensor 5 is installed on a pipeline between the magnetizer 4 and the low-pressure ball valve 6;

A second pressure sensor 8 is installed on a pipeline between the high-pressure pump 7 and the high-pressure ball valve 9;

The aeroponic cultivation rank 12 is a hollow vessel structure (e.g. trough, tank or bed), of which a bottom plate is opened with an overflow aperture 11, the water outlet of the high-pressure pump 7 is connected to the overflow aperture 11 and an inlet of the nutrient solution storage tank 1, respectively, via a pressure regulation valve 16, forming a pressure regulation type overflow structure;

A spraying direction of the high-pressure water mist spraying head 10 straightly faces the roots 2 of the crop seedling 15;

The aeroponic cultivation rank 12 is installed on the bracket 13.

The nutrient solution is prepared by adding and mixing the following components by weight evenly in 100 t of water: 95 kg of calcium nitrate, 81 kg of potassium nitrate, 50 kg of magnesium sulfate, 15.5 kg of ammonium biphosphate, 15-25 kg of ferric sodium EDTA salt, 0.3 kg of boric acid, 0.2 kg of manganese sulfate, 0.022 kg of zinc sulfate, 0.005 kg of copper sulfate and 0.002 kg of sodium molybdate or ammonium molybdate.

The high-pressure water mist spraying head 10 is the "Super Fine Mist Spraying Head" in the applicant's prior patent application No. "200610017940.7".

The filter 3 is the "Low-pressure Efficient Filter" in the applicant's prior patent application No. "200920091513.2".

The pipeline between the nutrient solution storage tank 1 and the high-pressure pump 7 is a low pressure pipeline, and the pipeline between the high-pressure pump 7 and the high-pressure water mist spraying head 10 is a high pressure pipeline;

The aeroponic cultivation rank 12 is made by assembling a plurality of basic units;

The basic unit includes a base and a supporting rank arranged on the base. The supporting rank is in an "A" shape formed by a left slant support, a right slant support and a transverse duct support transversely installed between the two slant supports, wherein the left slant support and the right slant support are joined to one another at one end. The supporting ranks are provided symmetrically in two, and the two supporting ranks are fixedly connected by a connection support across the tops therebetween. The left slant supports and the right slant supports of the two supporting ranks are provided thereon with a foam cultivation plate, the base underneath the foam cultivation plate is provided thereon with a bottom seal formed by a PEP agricultural black-white film, the bottom seal and the foam cultivation plates on the two sides together define a mist spraying space for the roots of the crop seedling; the water outlet of the high-pressure pump is connected to inlets of a plurality of the mist spraying ducts via the high-pressure ball valve, the mist spraying duct extends into the mist spraying space of each basic unit, the extended portion of the mist spraying duct is provided with a plurality of high-pressure water mist spraying heads, forming a nebulizing structure for the nutrient solution.

The number of the high-pressure water mist spraying head 10 is one or more.

The magnetizer 4, the first pressure sensor 5, the second pressure sensor 8, the high-pressure pump 7, the low-pressure ball valve 6, the high-pressure ball valve 9, the pressure regulation valve 16, the low pressure pipeline and the high pressure pipeline are all commercially available products.

When the present disclosure is in use, the prepared nutrient solution is placed into the nutrient solution storage tank 1, the nutrient solution is firstly filtered by the filter 3 and magnetized by the magnetizer 4, and is then delivered by the high-pressure pump 7 to the high-pressure water mist spraying head to be nebulized and subsequently sprayed, and the nebulized nutrient solution is delivered into an inner cavity of the aeroponic cultivation rank 12. The mist particles, with a diameter of 1-100 μm, have strong diffusibility, and the mist flow has certain motility and entrains air, to directly make the gaseous liquid be direct contact with the roots of the crop seedling, and supply necessary nutrients to the crop seedling. The high-pressure pump 7, having a large power, favorably prevents the spray nozzle from clogging and allows stable operation of the system. In comparison to the conventional technologies, the biggest advantages are: (1) the mist particles have a smaller diameter and strong diffusibility, and fusion ability of the gaseous liquid for the growth of crops is better; (2) the spray nozzle is not easy to be clogged, and stability property of the system is enhanced; (3) the nutrient solution that is not absorbed by the crops will flow back to the nutrient solution supply system through the overflow aperture 11 on the bottom of the aeroponic cultivation rank 12.

Example 2

Figure 2:
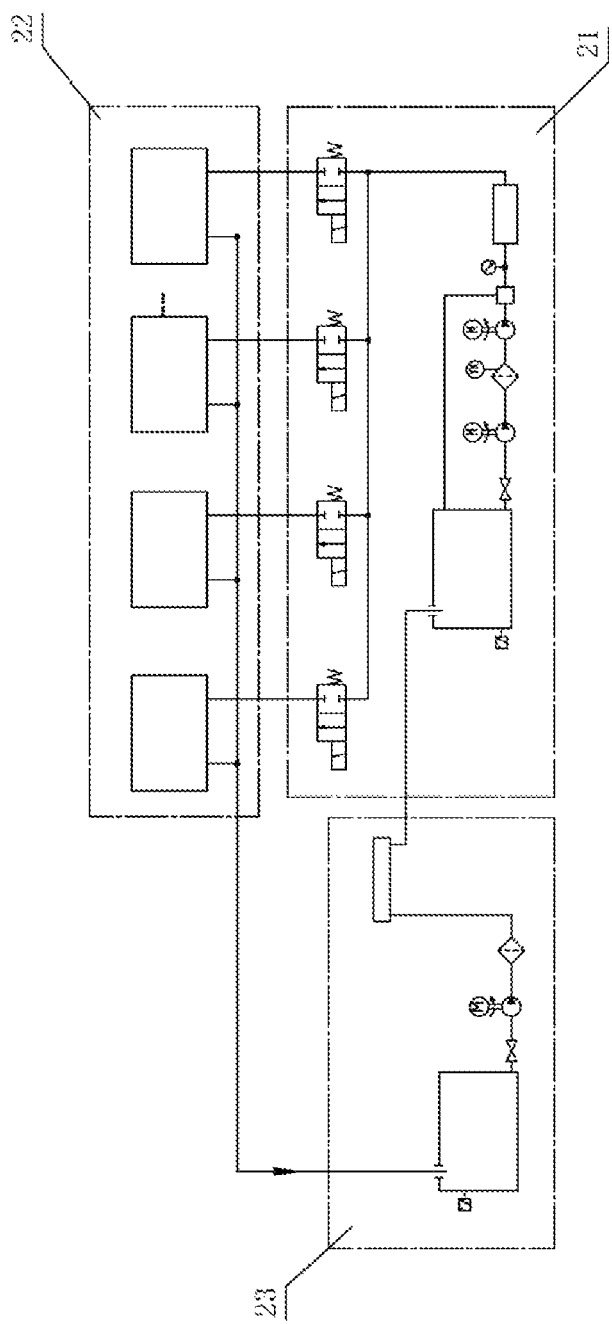
FIG. 2 is another structural schematic view of the high-pressure water mist ecological cultivation system of the present disclosure.

As shown in FIG. 2, another high-pressure water mist ecological cultivation system of the present disclosure includes a water processing device (not shown in the figure), a nutrient solution supply system assembly 21, a cultivation rank assembly 22, a nutrient solution back-flow system assembly 23 and a control cabinet (not shown in the figure). The nutrient solution supply system assembly 21 pressurizes the nutrient solution and then delivers the same to the cultivation rank assembly 22. The cultivation rank assembly 22 plants and cultures the crop seedlings. The nutrient solution back-flow system assembly 23 recovers the nutrient solution that is not absorbed by the crop seedlings for recycled use. The control cabinet is a supporting electric control cabinet that supplies power to the high-pressure water mist cultivation system and controls the high-pressure water mist cultivation system.

Figure 3:
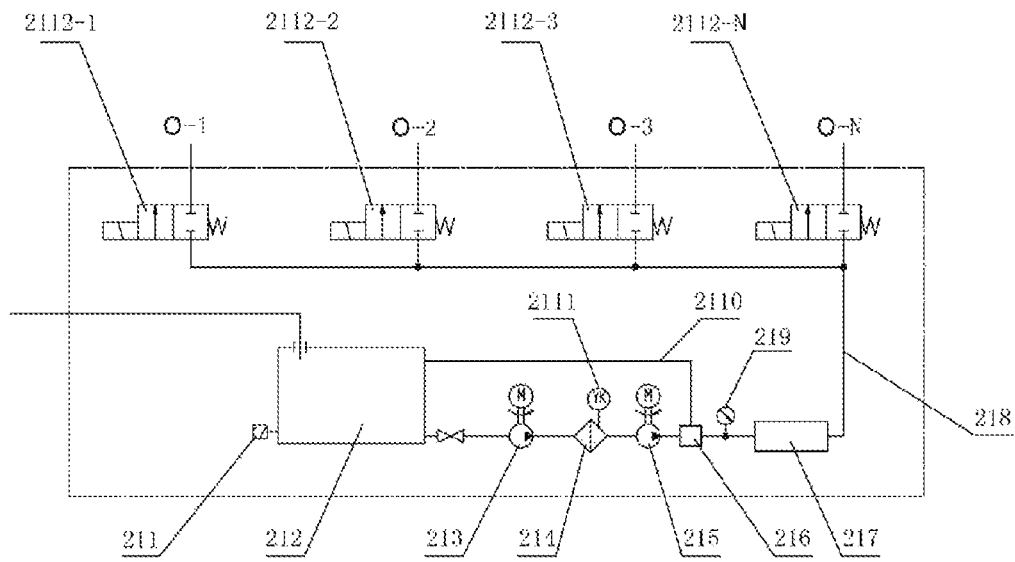
FIG. 3 is a schematic view of a nutrient solution supply system assembly of the present disclosure.

As shown in FIG. 3, the nutrient solution supply system assembly 21 includes a nutrient solution storage tank 212, a water supplement booster pump 213, a filter 214, a pressure controller 2111, a high-pressure pump set 215, an overflow valve 216, a magnetized water device 217 and partition control valves 2112-1, 2112-2, 2112-3 . . . 2112-N, wherein N is any arbitrary integer. The prepared nutrient solution in the nutrient solution storage tank 212 is pressurized by the water supplement booster pump 213, then passes through the filter 214, and enters the high-pressure pump set 215. The high-pressure nutrient solution output by the high-pressure pump set 215, after being magnetized by the magnetized water device 217, is delivered via the first duct 218 to the partition control valves 2112-1, 2112-2, 2112-3 . . . 2112-N respectively, and then further delivered to the respective cultivation ranks of the cultivation rank assembly 22 via respective exits O-1, O-2, O-3 . . . O-N of the partition control valves. The nutrient solution storage tank 212 is provided with a liquid level transducer, through which the control cabinet monitors and alarms in real time for the liquid level of the nutrient solution storage tank 212, realizing a function of automatically spraying the cultivation ranks at a fixed time. A pressure controller 2111 is provided at one exit of the filter 214, and is used for checking the filter 214 and feeding a clogging signal back to the control cabinet. Upon receiving the clogging signal by the control cabinet, a corresponding alarm on the control cabinet will send an alert, such that maintenance is timely carried out in response to the alert. The solution outlet of the high-pressure pump set 215 is provided with an overflow valve 216, which is used for system unloading and control of the pressure of the system, so as to ensure the stability of the pressure during operation of the system and achieve safety protection of the high-pressure pump set. Moreover, one overflow opening of the overflow valve 216 is connected to the nutrient solution storage tank 212 via a second duct 2110, so as to form a loop. The other exit of the overflow valve 216 is provided with a pressure gauge 219, such that the pressure of the system is conveniently observed. The partition control valves 2112-1, 2112-2, 2112-3 . . . 2112-N are installed at the water inlet ducts of the respect cultivation ranks of the cultivation rank assembly 22, receiving instructions from the control cabinet and realizing partitioned control over the cultivation ranks.

Figure 4:
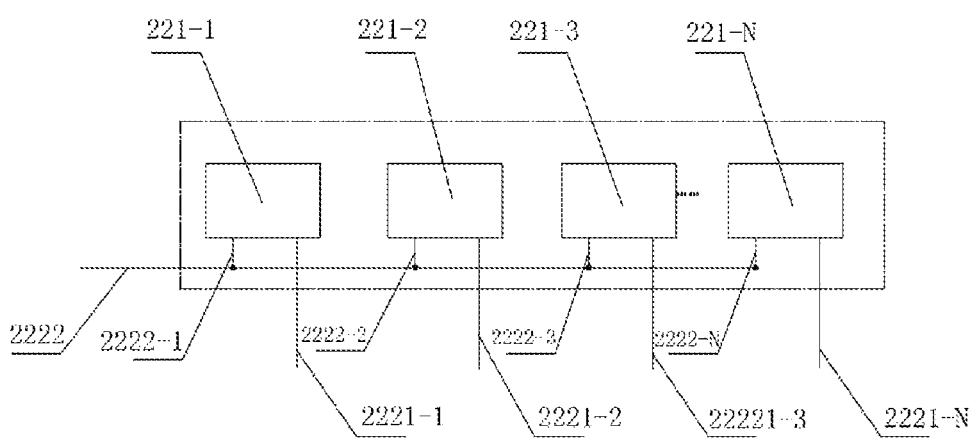
FIG. 4 is a schematic view of a cultivation rank assembly of the present disclosure.
Figure 5:
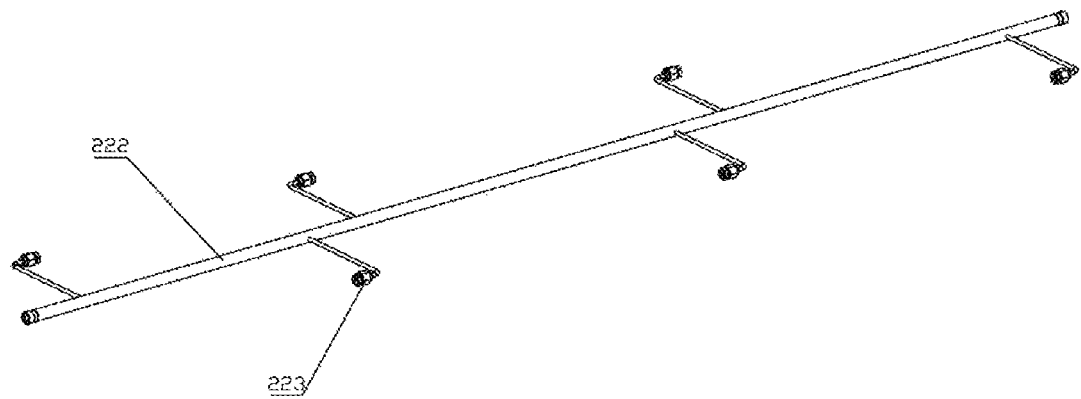
FIG. 5 is a schematic view of arrangement of spraying heads of the cultivation rank assembly of the present disclosure.

As shown in FIG. 4 and FIG. 5, the cultivation rank assembly 22 includes a first cultivation rank 221-1, a second cultivation rank 221-2, a third cultivation rank 221-3 . . . and an $N^{th}$ cultivation rank 221-N. The number of cultivation ranks can be provided based on the need. The cultivation ranks are all provided thereon with a nutrient solution delivery duct 222, a super fine water mist spraying head 223 and a plant planting structure (not shown in the figures). The cultivation ranks include cultivation ranks for leaf vegetable crops, solanaceous crops, allium tuberosum and apium graveolens, and based on different categories of the cultivation ranks, different plant planting structures and manners are adopted. Each cultivation rank is formed by assembling a plurality of basic units. Preferably, the basic unit includes a base and a supporting rank arranged on the base, the supporting rank is in an "A" shape formed by a left slant support, a right slant support and a transverse duct support which is installed transversally between the two slant supports, wherein the left slant support and the right slant support are joined to one another at one end. The supporting ranks are provided symmetrically in two, and the two supporting ranks are fixedly connected by a connection support across the tops therebetween. The left slant supports and the right slant supports of the two supporting ranks are provided thereon with a foam cultivation plate, the base underneath the foam cultivation plate is provided thereon with a bottom seal formed by a PEP agricultural black-white film, the bottom seal and the foam cultivation plates on the two sides together define a mist spraying space for the roots of the crop seedlings. The respective water inlet ducts 2221-1, 2221-2, 2221-3 . . . 2221-N of the cultivation ranks 221-1, 221-2, 221-3 . . . 221-N are respectively provided with respective partition control valves 2112-1, 2112-2, 2112-3 . . . 2112-N, to control the spraying for different cultivation ranks in accordance with time and region according to the growth requirement of the plant in each cultivation rank. The high-pressure nutrient solution is sprayed out in nebulized form through the spraying head 223 within each cultivation rank. The mist particles, with a diameter of 1-100 μm, have strong diffusibility, and the mist flow has certain motility and entrains air, to deliver the nebulized nutrient solution into the inner cavity of the cultivation ranks, such that the gaseous liquid is directly in contact with the roots of the crop seedling, and supplies necessary nutrients to the crop seedling. The bottom of each of the cultivation ranks 221-1, 221-2, 221-3 . . . 221-N is provided with a nutrient solution collection opening (not shown in the figures), the nutrient solution collection openings are respectively provided with corresponding nutrient solution back-flow ducts 2222-1, 2222-2, 2222-3 . . . 2222-N; each nutrient solution back-flow duct is connected to the back-flow main duct 2222, and the collected nutrient solution flows back to the nutrient solution back-flow tank 232 of the nutrient solution back-flow system assembly 23 for reutilization.

Figure 6:
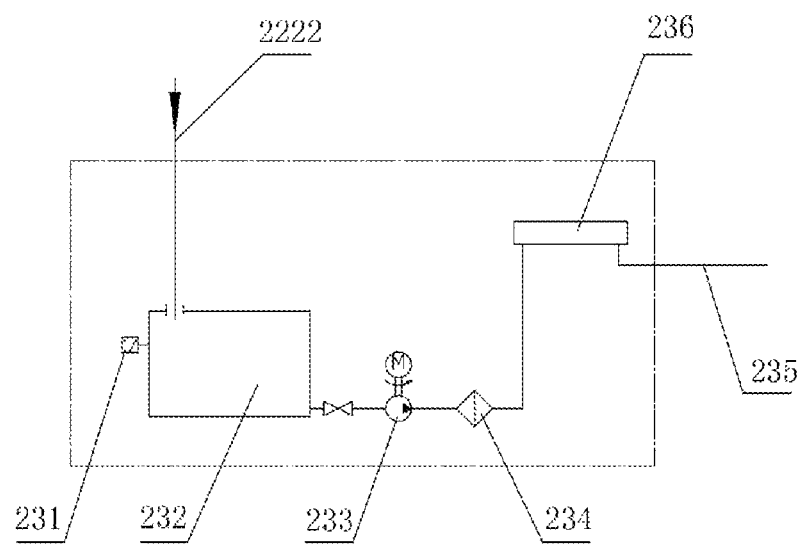
FIG. 6 is a schematic view of a nutrient solution back-flow system assembly of the present disclosure.
Figure 7:
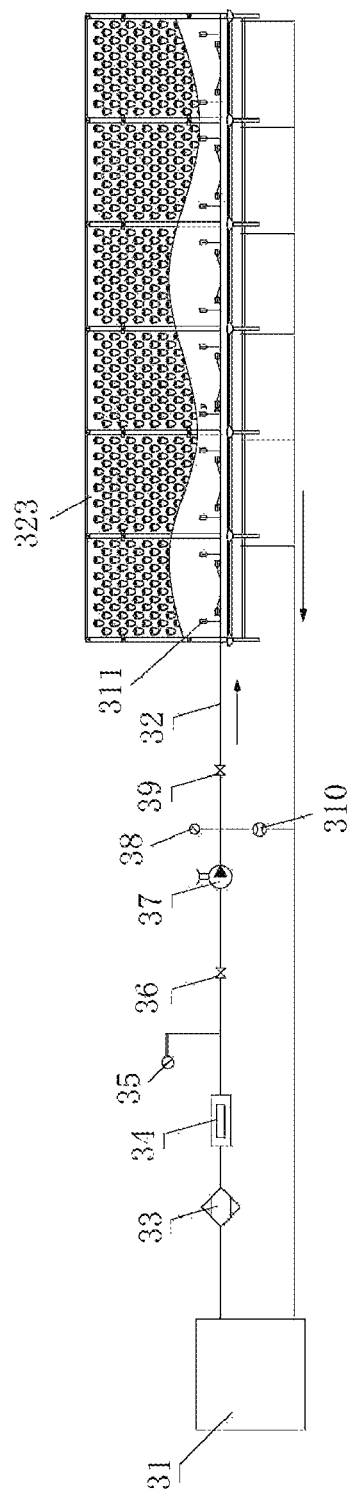
FIG. 7 is a structural schematic view of a leaf vegetable cultivation system of the present disclosure.
Figure 8:
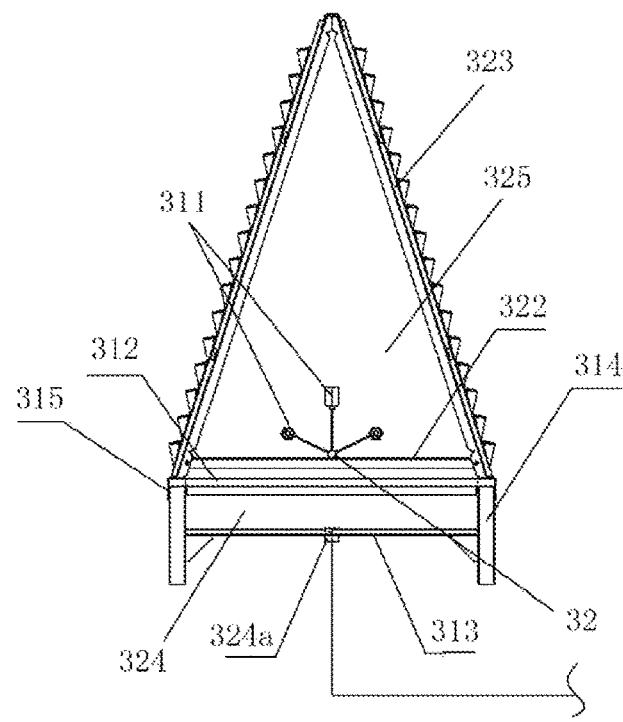
FIG. 8 is a side view of a leaf vegetable cultivation rank of the present disclosure.
Figure 9:
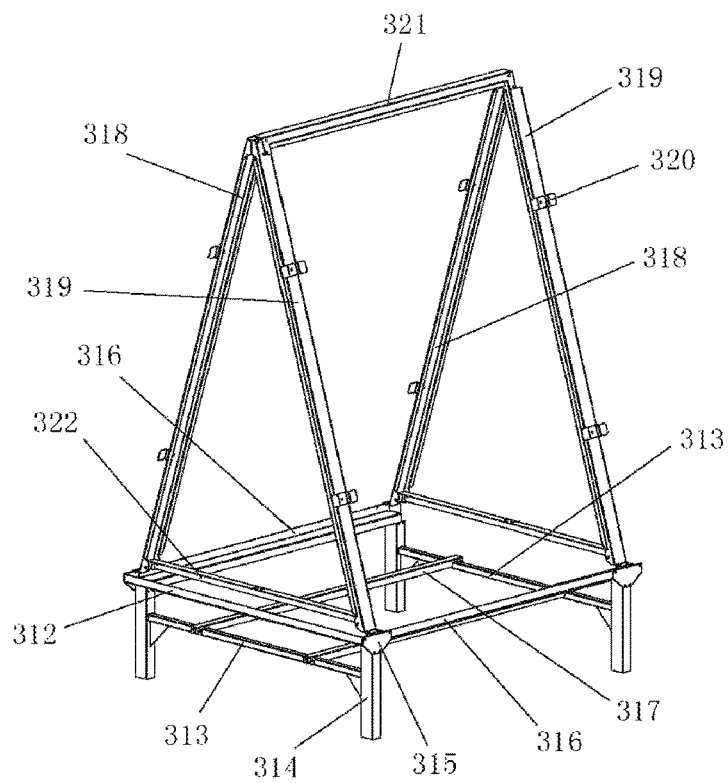
FIG. 9 is a perspective view of a basic unit of the present disclosure.

As shown in FIG. 6, the nutrient solution back-flow system assembly 23 includes a nutrient solution back-flow tank 232, a nutrient solution supplement pump 233, a supplement solution filter 234, and an UV sterilizer 236. The nutrient solution that is not absorbed by the crops flows back to the nutrient solution back-flow tank 232 via the nutrient solution back-flow duct 2222. The nutrient solution back-flow tank 232 is provided thereon with a liquid level switch 231. When the liquid level of the nutrient solution back-flow tank 232 rises to a predetermined height, a nutrient solution back-flow pump 233 is initiated. The nutrient solution within the nutrient solution back-flow tank 232 is pressurized, filtered, disinfected and sterilized via the supplement solution filter 234 and the UV disinfector 236, and then delivered via a main delivery duct 235 to the nutrient solution storage tank 212 of the nutrient solution supply system assembly 21 for recycled use. The process above is controlled by a control cabinet.

The nutrient solution is prepared by adding and mixing the following components by weight evenly in 100 t of water: 95 kg of calcium nitrate, 81 kg of potassium nitrate, 50 kg of magnesium sulfate, 15.5 kg of ammonium biphosphate, 15-25 kg of ferric sodium EDTA salt, 0.3 kg of boric acid, 0.2 kg of manganese sulfate, 0.022 kg of zinc sulfate, 0.005 kg of copper sulfate and 0.002 kg of sodium molybdate or ammonium molybdate. The water added is water that has been processed by the water processing device.

The super fine water mist spraying head 223 is the "Super Fine Mist Spraying Head" in the applicant's prior patent application No. "200610017940.7".

The filter 214 and the supplement solution filter 234 are the "Low-pressure Efficient Filter" in the applicant's prior patent application No. "200920091513.2".

The partition control valve is a mature product designed and manufactured by the applicant.

The magnetized water device 217, the high-pressure pump set 215, the water processing device (a reverse osmosis water processing device from Zhengzhou Youbang Water Treatment device Co. Ltd can be used) and the overflow valve 216 (available from Italian AR company) are all commercially available products.

Example 3

As illustrated by FIGS. 7-13, the present disclosure includes a nutrient solution supply system and a leaf vegetable cultivation rank, in which the leaf vegetable cultivation rank is formed by assembling a plurality of basic units, each basic unit includes a base and a supporting rank arranged on the base, the supporting rank is in an "A" shape formed by a left slant support 318, a right slant support 319 and a transverse duct support 322 transversally installed between the two slant supports, wherein the left slant support and the right slant support are joined to one another at one end. The supporting ranks are provided symmetrically in two, and the two supporting ranks are fixedly connected by a connection support 321 across the tops therebetween. The left slant support 318 and the right slant support 319 of the two supporting ranks are provided thereon with a foam cultivation plate 323, the base underneath the foam cultivation plate 323 is provided with a bottom seal formed by a PEP agricultural black-white film 324, the bottom seal and the foam cultivation plates 323 on the two sides together define a mist spraying space 325 for roots of leaf vegetables. The nutrient solution supply system includes a nutrient solution storage tank 31, a filter 33, a magnetizer 34, a low-pressure ball valve 36, a high-pressure pump 37, a high-pressure ball valve 39 and a high-pressure water mist spray head 311. A solution outlet of the nutrient solution storage tank 31 is connected to a water inlet of the high-pressure pump 37 via the filter 33, the magnetizer 34 and the low-pressure ball valve 36 in series connection. A water outlet of the high-pressure pump 37 is connected to water inlets of a plurality of mist spraying ducts 32 via the high-pressure ball valve 39; the mist spraying duct 32 extends into the mist spraying space of each basic unit; the extended portion of the mist spraying ducts is provided thereon with a plurality of the high-pressure water mist spraying heads 311, which form nebulizing structures for the nutrient solution. The nutrient solution stored in the nutrient solution storage tank 31 is firstly filtered by the filter 33 and magnetized by the magnetizer 34, and is then delivered by the high-pressure pump 37 to respective high-pressure water mist spray heads 311 to be nebulized and subsequently sprayed. The nutrient solution is diffused to the entire mist spraying space, so that the leaf vegetables are in an optimal root status to grow and develop.

In order to ensure the use effect, the base includes vertically disposed supporting legs 314, an upper frame provided on the tops of the supporting legs and a lower frame provided at the lower portions of the supporting legs. The upper frame is in a rectangular shape formed by two supporting frames 312 spaced apart in parallel to each other and two side supports 316 spaced apart in parallel to each other and perpendicular to the supporting frames 312. End portions of the supporting frames 312 and of the side supports 316 are all connected with upper ends of the supporting legs 314;

The supporting frame 312 has an L-shaped section. An upper edge of the PEP agricultural back-white film is fixed onto a bottom face of the supporting frame via a batten, and a lower portion of the PEP agricultural back-white film is placed on the lower frame, forming a bottom seal of the mist spraying space.

The end portions of the supporting frames 312 and of the side supports 316 are all connected to the upper ends of the supporting legs 314 via connection plates 315;

The lower frame includes a bottom plate support 313 and a lapping support 317. The bottom plate support 313 is provided between the two supporting legs 314. Two ends of the lapping support 317 are provided with a clamping slot 317a corresponding to the bottom plate support 313, and the lapping support is snap-fitted between the two bottom plate supports 313 via the clamping slots 317a on the two ends, forming a connection structure between each two basic units;

The bottom of the PEP agricultural back-white film 324 is provided with a nutrient solution back-flow aperture 324a. The water outlet of the high-pressure pump 37 is connected to an inlet of the nutrient solution storage tank 31 and to the back-flow aperture at the bottom of the PEP agricultural black-white film of each basic unit, respectively, via a pressure regulation valve 310, forming a pressure regulation type overflow structure. The nutrient solution that is not absorbed flows back to the nutrient solution back-flow tank 31 via a back-flow duct for recycled use. The leaf vegetable cultivation rank is provided thereon with a temperature sensor, which is connected to the high-pressure pump 37 via a controller, and the controller can control the switch-on and -off of the high-pressure pump according to a temperature signal received from the temperature sensor, so as to adjust the time of the mist spraying.

The high-pressure water mist spraying heads are provided symmetrically in two inside the mist spraying space of each basic unit, each including a first water mist spraying head 311a with a spraying direction arranged horizontal and a second water mist spraying head 311b with a spraying direction arranged vertically upward. The mist spraying duct 32 is placed on the transverse duct support 322 of each basic unit. The first water mist spraying head 311a in each high-pressure water mist spraying head is in 2, being provided on two sides of the mist spraying duct 32, respectively, via slant branch ducts 326, and the second water mist spraying head 311b is provided above the mist spraying duct 32 through a vertical branch duct 327, so as to ensure uniform spraying;

A first pressure sensor 35 is installed on a pipeline between the magnetizer 34 and the low-pressure ball valve 36, and a second pressure sensor 38 is installed on a pipeline between the high-pressure pump 37 and the high-pressure ball valve 39;

The left slant support 318 and the right slant support 319 are both provided thereon with a fastener 320 for fixing the foam cultivation plate 323.

The high-pressure water mist spraying head 311 is the "Super Fine Mist Spraying Head" in the applicant's prior patent application No. "200610017940.7".

The filter 33 is the "Low-pressure Efficient Filter" in the applicant's prior patent application No. "200920091513.2".

The foam cultivation plate 323 is the "Forming Cultivation Cystosepiment" in the applicant's prior patent application No. "201610526449.0";

A pipeline between the nutrient solution storage tank 31 and the high-pressure pump 37 is a low-pressure pipeline, and a pipeline between the high-pressure pump 37 and the high-pressure water mist spraying head 311 is a high-pressure pipeline; the magnetizer 34, the first pressure sensor 35, the second pressure sensor 38, the high-pressure pump 37, the low-pressure ball valve 36, the high-pressure ball valve 39, the pressure regulation valve 310, the low-pressure pipeline, and the high-pressure pipeline are all commercially available products.

Figure 10:
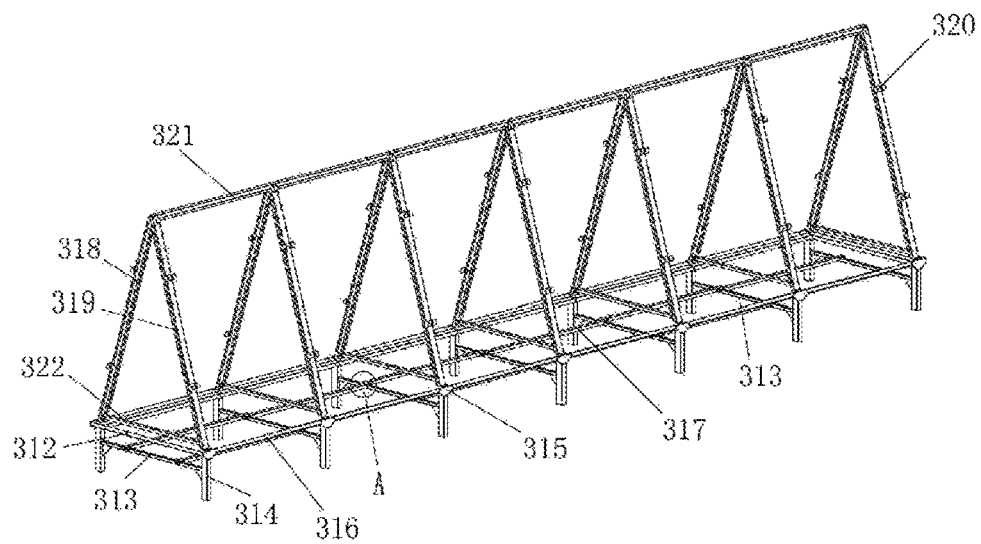
FIG. 10 is a schematic view of assembled basic units of the present disclosure (six basic units).
Figure 11:
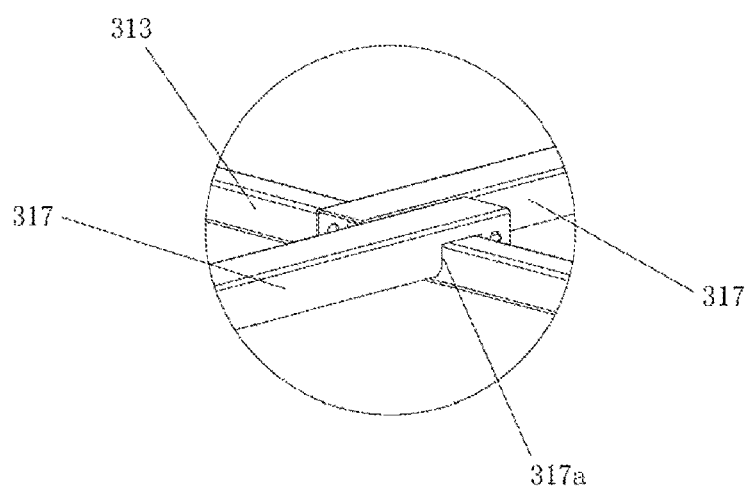
FIG. 11 is an enlarged view of site A of FIG. 10.
Figure 12:
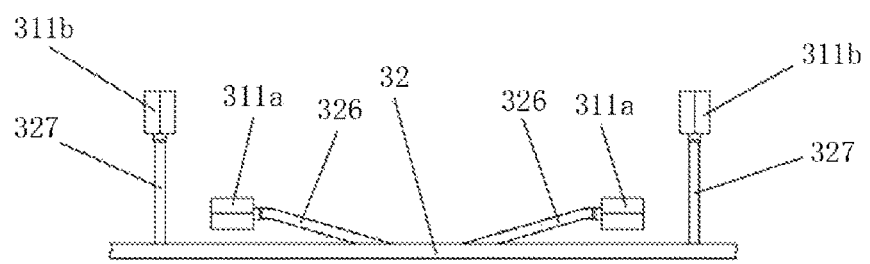
FIG. 12 is a schematic view of arrangement of a high-pressure water mist spraying head of the present disclosure.
Figure 13:
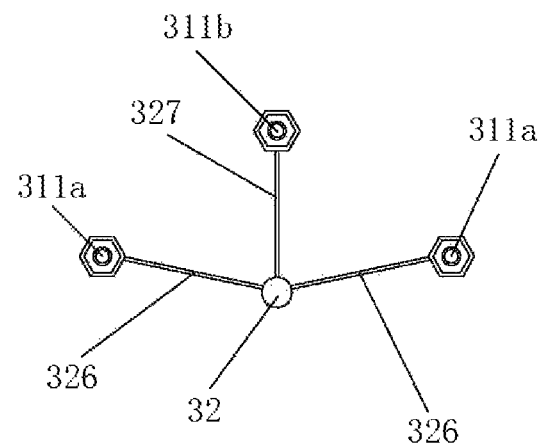
FIG. 13 is a side view of FIG. 12.
Figure 14:
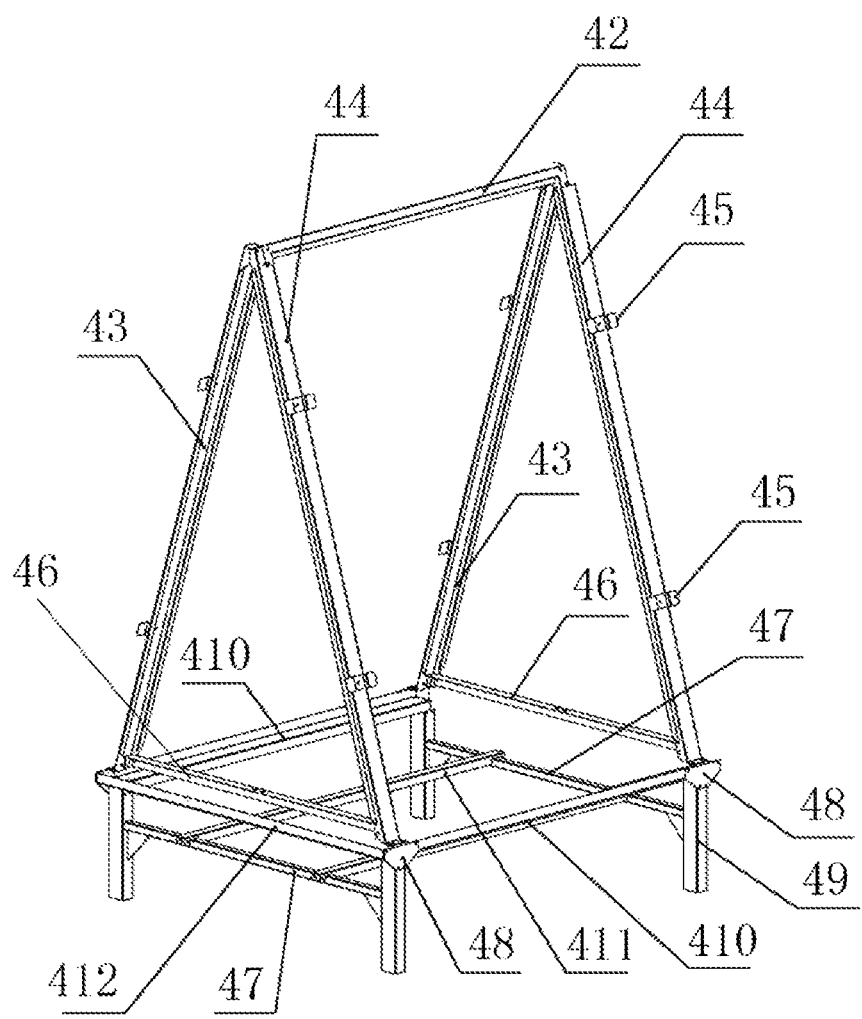
FIG. 14 is a perspective view of another basic unit of a modular cultivation rank for leaf vegetable crops of the present disclosure (a foam cultivation plate or a PEP agricultural black-white film is not installed).
Figure 15:
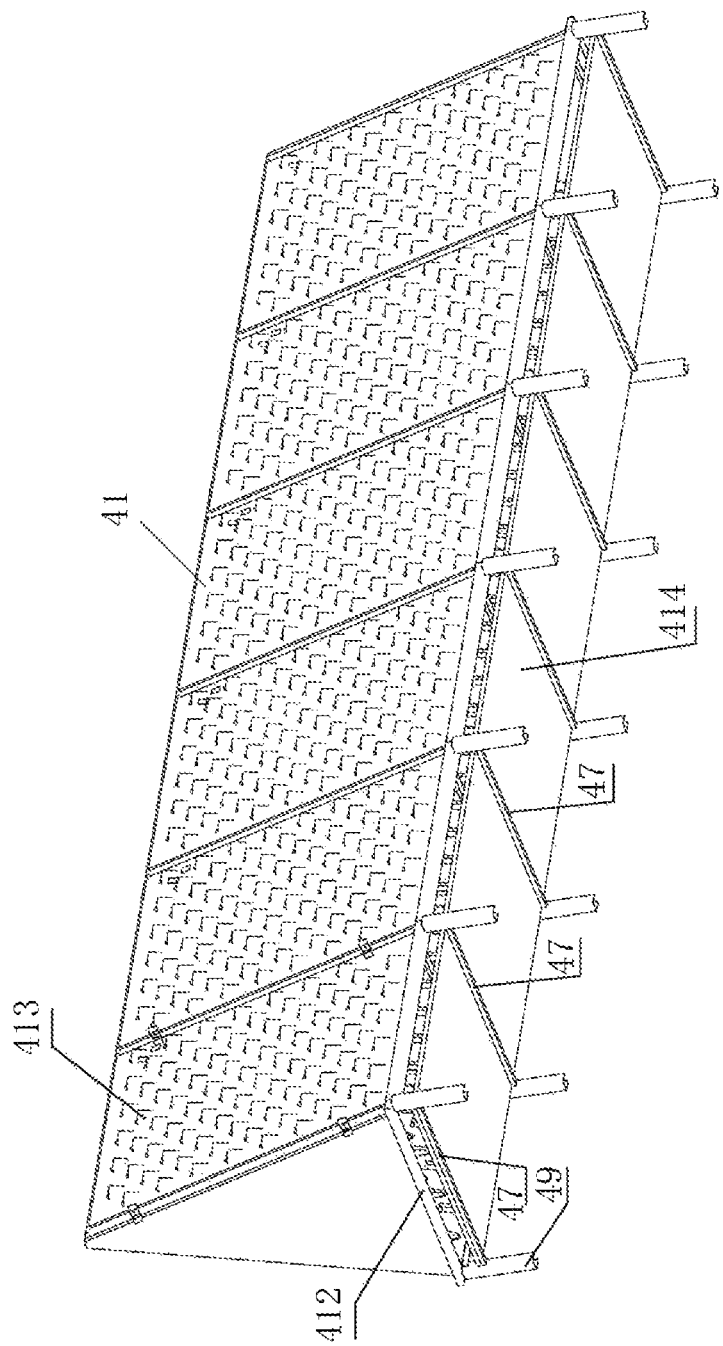
FIG. 15 is a use state view of another basic unit of the present disclosure.

When the present disclosure is in use, a plurality of the basic units can be assembled together for use. As shown in FIG. 10, 6 basic units are assembled together. When assembling each basic unit, the supporting legs, the supporting frames, the side supports, the left slant support and the right slant support are connected together through the connection plate, in the bottom, two adjacent bottom plate supports are connected together via the lapping support, and the top is connected via the connection support 321. The installation is simple and the disassembly is convenient.

In use, a plant seedling is wrapped by a planting cotton and put into a planting cup, the plant is substantially kept in an upright position after being planted in the cultivation aperture, such that the plant grows upright and shading is reduced. During the growth, each plant and each leaf have a growing space, can get enough sunshine and absorb adequate moisture and nutrient, ensuring rapid and uniform growth of the plants, and considerably improving the yield and quality. The nutrient solution stored in the nutrient solution storage tank 31 is firstly filtered by the filter 33 and magnetized by the magnetizer 34, and is then delivered by the high-pressure pump 37 to respective high-pressure water mist spraying heads to be nebulized and subsequently sprayed. The nutrient solution is diffused to the entire mist spraying space, so that the leaf vegetables are in an optimal root status to grow and develop. The nutrient solution that is not absorbed by the plant flows back to the nutrient solution supply tank via the back-flow aperture for recycled use. As compared to the prior art, the frame of the present disclosure is good in rigidity, and scientific, simple and reasonable in structure, and forms a set of standard parts, meanwhile, it solves the problems of transportation, recycled use, and temporary site placement, and a plurality of cultivation rank standard modules can be easily assembled for use based on the size of cultivation scales, which remedies the deficiency of conventional solanaceous cultivation ranks. It not only reduces the cost, but also demonstrates more remarkable advantages in improving the plant cultivation efficiency. It is novel and unique in structure, simple and reasonable, and is easy to manufacture and convenient to transport; it can be assembled quickly for overall arrangement in the cultivation areas, and saves labor and time; it not only reduces the cost, but also demonstrates more remarkable advantages in improving the plant cultivation efficiency; it bypasses land—the conventional agricultural cultivation medium, and delivers the nutriment (water solution) as required by the growth of leaf vegetables to the roots of vegetables in the form of mist. The mist is high in flow rate, high in density, uniform in mist flow, wide in coverage, high in turbulent extent and high in air entrainment capability, and the requirements of roots for air, moisture, and nutrient can be simultaneously met; a mist particle is 1-100 μm in diameter, which can improve the absorption efficiency of leaf vegetables for nutrient; it has advantages such as saving water, fertilizer, land, and energy, being environmentally friendly, clean, and safe, requiring low investment, low cost, and less labor, easy operation, and high yield and good quality of the products; it is convenient to use and has a good effect, and has excellent social and economic benefits.

Example 4

As shown in FIGS. 14-20, a modular cultivation rank for leaf vegetable crops of the present disclosure is formed by assembling a plurality of basic units; each basic unit including a base and a supporting rank arranged on the base, the supporting rank is in an "A" shape formed by a left slant support, a right slant support and a transverse duct support which is installed transversally between the two slant supports, wherein the left slant support and the right slant support are joined to one another at one end. The supporting ranks are provided symmetrically in two, and the two supporting ranks are fixedly connected by a connection support 42 across the tops therebetween. The left slant supports and the right slant supports of the two supporting ranks are provided thereon with a foam cultivation plate. The left slant support and the right slant support are both provided thereon with a fastener 45 for fixing a foam cultivation plate.

In order to ensure the use effect, the base includes vertically disposed supporting legs 49, an upper frame provided on the tops of the supporting legs and a lower frame provided at the lower portions of the supporting legs. The upper frame is in a rectangular shape formed by two supporting frames 410 spaced apart in parallel to each other and two side supports 412 spaced apart in parallel to each other and perpendicular to the supporting frames. End portions of the supporting frames 410 and of the side supports 412 are all connected with upper ends of the supporting legs 49;

The base underneath the foam cultivation plate is provided thereon with a PEP agricultural black-white film. The supporting frame 312 has an L-shaped section. An upper edge of the PEP agricultural back-white film is fixed onto a bottom face of the supporting frame via a batten, and a lower portion of the PEP agricultural back-white film is placed on the lower frame, forming a root cultivation space for leaf vegetable crops, and the PEP agricultural black-white film in the lower portion of the cultivation space is provided thereon with a nutrient solution back-flow aperture;

The end portions of the supporting frames 410 and of the side supports 412 are all connected to the upper ends of the supporting legs via connection plates 48. Lower ends of the left slant support 43 and the right slant support 44 are fixedly connected to the connection plates 48;

The lower frame includes a bottom plate support 47 and a lapping support 411. The bottom plate support 47 is provided between the two supporting legs. Two ends of the lapping support 411 are provided with a clamping slot 411a corresponding to the bottom plate support, and the lapping support 411 is snap-fitted between the two bottom plate supports 47 via the clamping slots 411a on the two ends, forming a connection structure between each two basic units. The lower frame can be additionally provided thereon with a bottom supporting plate 414, and the PEP agricultural black-white film can be placed on the bottom supporting plate for holding the PEP agricultural black-white film;

The lapping support outside the clamping slot 411a is provided thereon with a fixing aperture 411b;

The foam cultivation plate includes a baseplate 41, the baseplate 41 is uniformly distributed thereon with a plurality of upward inclined cultivation apertures 413, and the cultivation apertures 413 are provided therein with planting cups 415;

The cultivation apertures 413 are staggered and evenly arranged, a transverse distance L between every two cultivation apertures is 160 mm, and a longitudinal distance H between every two cultivation apertures is 170 mm;

The planting cup 415 is provided with a protruded edge on an outer wall of an upper opening portion thereof, the protruded edge is snap-fitted onto the upper opening portion of the cultivation aperture, thus holding the planting cup and forming a fixed structure of the planting cup;

An angle between an axis of the cultivation aperture 413 and a baseplate surface is 30°, and an angle between the baseplate surface and a vertical plane is 30°;

The cultivation apertures 413 are through holes with an aperture diameter of 30 mm.

The baseplate 41 has a thickness D of 30 mm.

Figure 16:
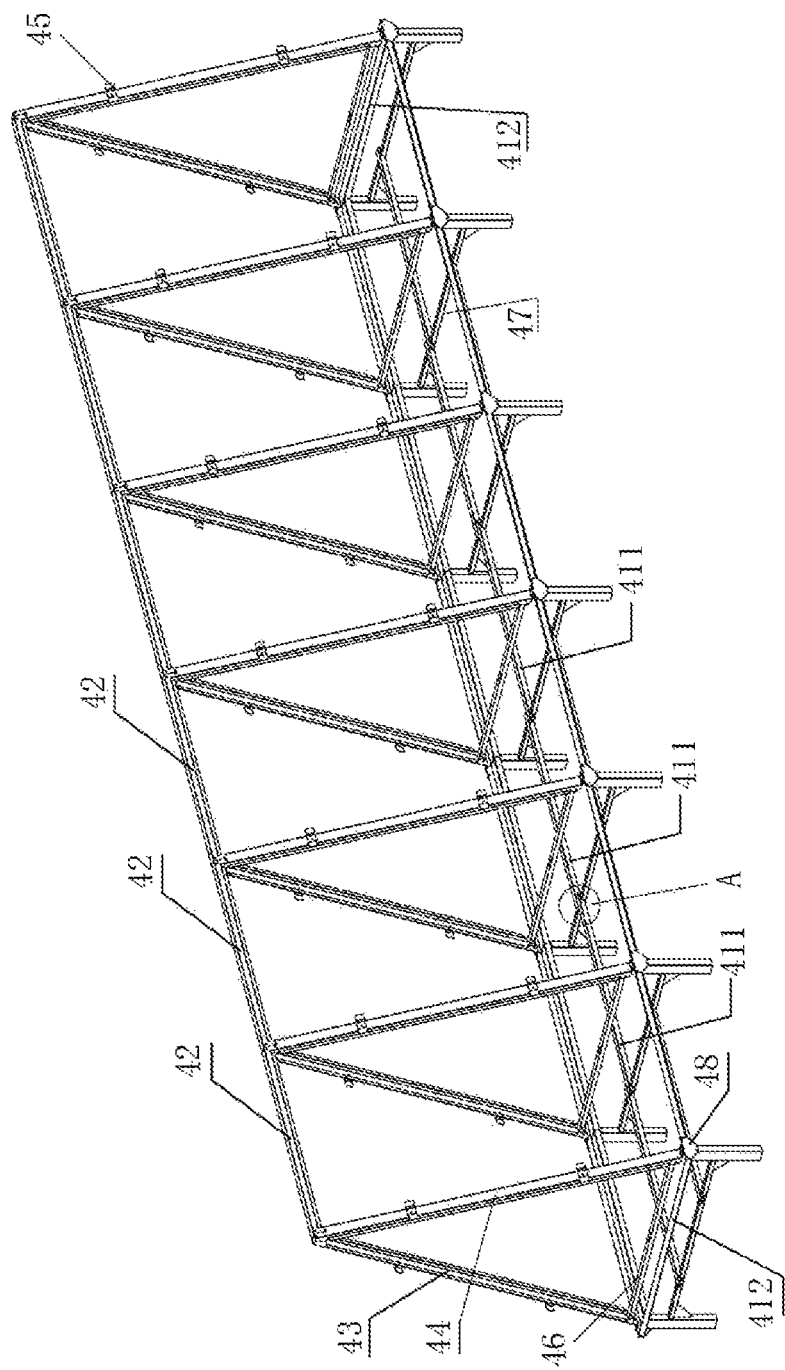
FIG. 16 is a schematic view of assembled another basic units (6 basic units).
Figure 17:
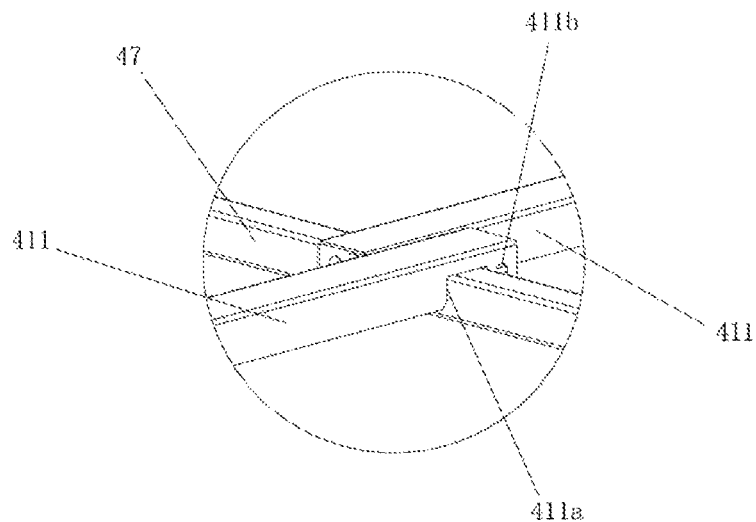
FIG. 17 is an enlarged view of site A of FIG. 16 of the present disclosure.
Figure 18:
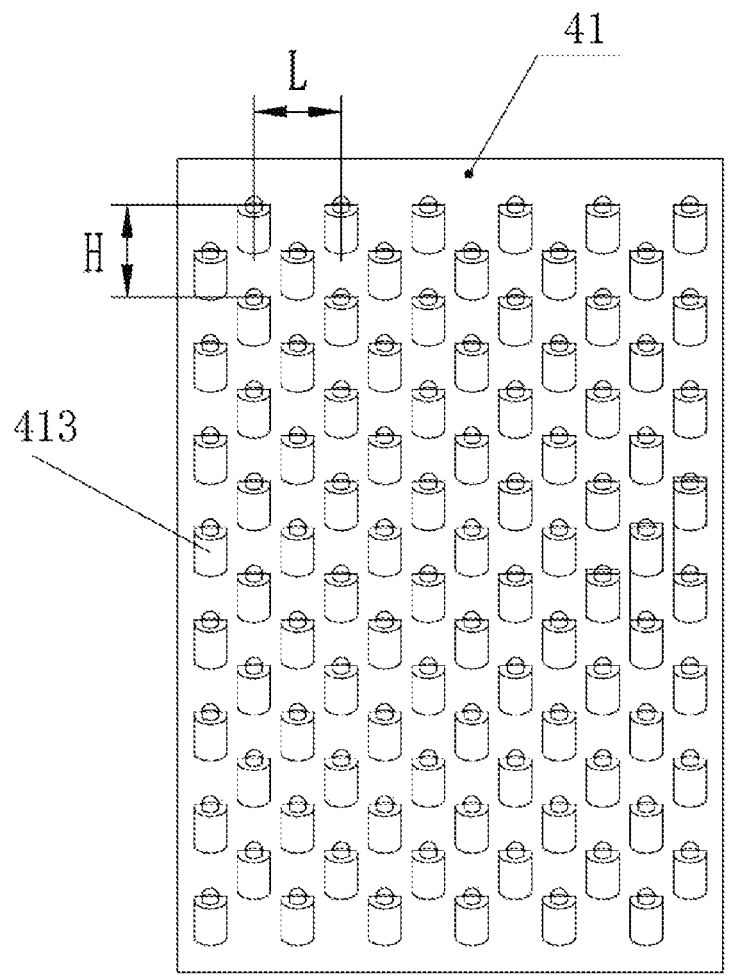
FIG. 18 is a front view of the foam cultivation plate of the present disclosure.
Figure 19:
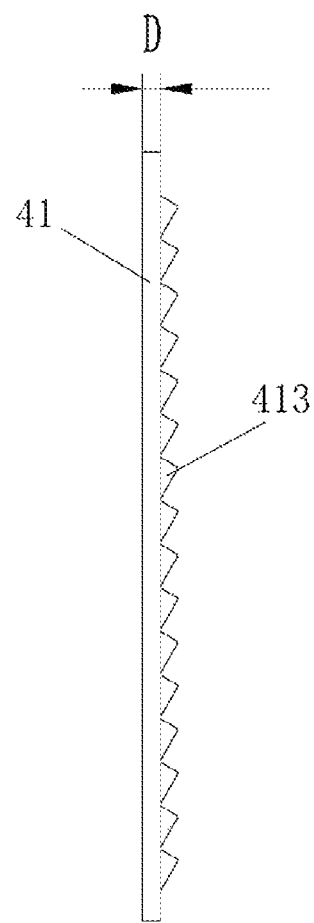
FIG. 19 is a top view of the foam cultivation plate of the present disclosure.
Figure 20:
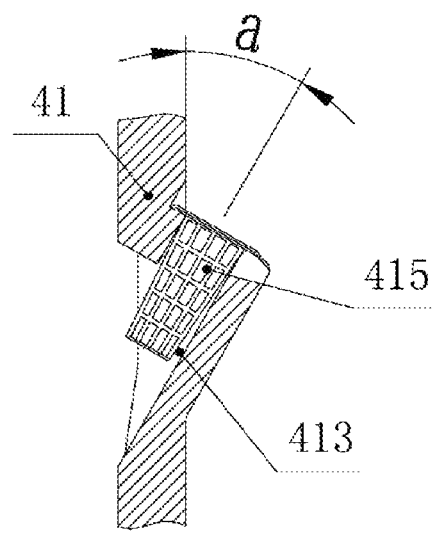
FIG. 20 is a sectional view of a cultivation aperture and planting cups of the foam cultivation plate of the present disclosure.

When the present disclosure is in use, a plurality of the basic units can be assembled together for use. As shown in FIG. 16, 6 basic units are assembled together. When assembling each basic unit, the supporting legs, the supporting frames, the side supports, the left slant support and the right slant support are connected together through the connection plate, in the bottom, two adjacent bottom plate supports are connected together via the lapping support, and the top is connected via the connection support 42. The installation is simple and the disassembly is convenient. In use, a mist spraying head for spraying nutrient solution is extended into the cultivation space formed by the PEP agricultural black-white film, such that the crop roots extended into the cultivation absorb enough nutrient solution to carry out various metabolic activities. The PEP agricultural black-white film at the lower portion of the cultivation space can be provided thereon with a nutrient solution back-flow aperture, the nutrient solution back-flow aperture can be connected to a back-flow duct, the back-flow duct is connected to the nutrient solution storage tank, and the collected nutrient solution that is not absorbed flows back to the nutrient solution storage tank via the back-flow duct to be recycled.

The plurality of cultivation apertures on the foam cultivation plate are staggered according to a plant distance and a row distance which are most beneficial to the growth of leaf vegetables, to make full use of the baseplate, and ensure the culture efficiency of plants. In use, it only needs to warp the plant seedling by a planting cotton and place the wrapped plant seedling into the planting cup. The planting cup within the cultivation aperture and the baseplate plane define an angle of 30°, and an angle between the baseplate surface and a vertical plane is 30°, so that the plant is kept substantially upright after its planting in the cultivation aperture, such that the plant grows upright and shading is reduced. During the growth, each plant and each leaf have a growing space, can get enough sunshine and absorb adequate moisture and nutrient, ensuring rapid and uniform growth of plants, and considerably improving the yield and quality. As compared to the conventional aeroponic cultivation foam plate, this foam cultivation plate is more advanced in technology, more reasonable in structure, and most suitable for the growth of leaf vegetables, and maximizes the growing potential of the plants, such that the mass of growth and biomass of the leaf vegetables are considerably improved, and it will definitely have a prospect of wide applications in the field of agricultural technologies.

In the structures above, according to the number of the basic units required, blanking and sheet-metal fabrication of all the members can be done all in once, which ensures consistent size and scale, facilitates quick assembly, and complete the overall arrangement in the cultivation areas, saves labor and time, and considerably improves the installation efficiency.

The frame of the modular cultivation rank of the present disclosure is good in rigidity, and scientific, simple and reasonable in structure, and forms a set of standard parts, meanwhile, it solves the problems of transportation, recycled use, and temporary site placement, and a plurality of cultivation rank standard modules can be easily assembled for use based on the size of the cultivation scales, which remedies the deficiency of conventional solanaceous cultivation ranks. It not only reduces the cost, but also demonstrates more remarkable advantages in improving the plant cultivation efficiency. It will definitely realize industrialization in the field of the agricultural development in real sense and possess a broad prospect.

In view of the above, in the present disclosure, the roots of crop seedlings are exposed to the cultivation rank or in the interior of the cultivation rank, and the nutrient solution is nebulized by the nutrient solution supply system into micrometer-scale mist droplets with a diameter of mist particles being 1-100 μm, the mist particles are directly sprayed onto the plant roots to supply the moisture and nutrient required by the growth of the plants, the plant roots are directly in contact with the air, which is the best form for solving a water-gas contradiction for roots among all the soilless cultivation technologies, there is no resistance for plant growth and the roots are well-flourished, which considerably improves the yield of crops, meanwhile, it is easy for automatic control and stereo cultivation, and increasing the utilization rate of greenhouse space. The present disclosure has the following advantages as compared to the prior art:

1) green

The high-pressure water mist ecological cultivation system of the present disclosure bypasses soils and enables industrialized planting, which prevents the invasion of pathogenic bacteria from the beginning; it is free from agricultural chemical pollution, conventional fertilizer (organic fertilizer, chemical fertilizer, etc.) pollution, heavy metal pollution or the like, and it is substantially free from insect pests; various nutrients as required by the plants are manually prepared in a precise manner, and the plants produced are green and of high quality, with better nutrition and taste; the adequate efficient utilization of nutrient elements also dramatically reduces the content of plant nitrate, so as to achieve green non-pollution in real sense;

2) water-saving and fertilizer-saving

The high-pressure water mist ecological cultivation system of the present disclosure realizes integration of water and fertilizer in real sense, which can allow precise water supplying and fertilizer supplying based on the need of the plant growth. The nutrient solution is absorbed and utilized at a high rate, and can be recycled. The utilization rate of water is approximately 100% and the utilization rate of fertilizers is approximately 100%, which saves both water and fertilizers.

3) land-saving and stereo production

The high-pressure water mist ecological cultivation system of the present disclosure, employing the stereo cultivation, does not reply on soils, let alone the conventional arable lands, considerably improves the planting efficiency in unit area, with a high space utilization rate, and can allow planting in wastelands, deserts, barren mountains, rooftops, indurative grounds and even part of water surface, islands, and high mountains. For the same size of areas, the planting area of the present disclosure is 3-4 times of conventional planting. The spatial arrangement is rational and intensive, thus allowing a space-oriented development that considerably increases the number and areas of arable lands;

4) high yield

When planting vegetables with the high-pressure water mist ecological cultivation system of the present disclosure, the roots of plants are well flourished, and the yield is considerably improved. As compared to the conventional land planting, the yield of leaf vegetables can be improved by 10-20 fold, and solanaceous types 5-10 fold;

5) environmentally friendly

The high-pressure water mist ecological cultivation system of the present disclosure saves water and fertilizers, and since it bypasses land, it will not pollute the air like conventional agricultural chemicals and chemical fertilizers, without discharge of water, and thus will not pollute the air, lands or water system, and it will not cause water loss, soil loss, or calamities like secondary pollution, and is safe and environmentally friendly.

6) labor-saving

The high-pressure water mist ecological cultivation system of the present disclosure enables a full automatic production process, only harvesting and planting are needed, without any other traditional agricultural work such as plowing. The operation is easy, and weak individuals such as the aged and women can participate in, thus saving the labor cost, and dispensing the heavy physical labor;

7) scaled and standardized planting

The cultivation scales of the high-pressure water mist ecological cultivation system of the present disclosure can be large or small, from a few hundreds of meter squares to thousands and ten thousands of acres; agricultural facility operated in an industrial manner is produced, fine planting is realized, the production process is managed in a standardized manner, and the product is traceable; the products produced have a high degree of homogenization in appearance, size, and quality; in the process of production, users can check in real time via mobile devices through Internet or intelligent Internet of things;

8) good quality

Leaf vegetables cultivated through mist have the vitamin content of 3-5 times the ordinary vegetables, and have a good taste, high nutrition. Aromatic vegetables have a stronger smell than those cultivated in soils.

9) achievement of functional agriculture

For the status quo of mineral deficiency of selenium, zinc, iron, calcium, iodine and so on in regional populations in China, corresponding plant nutritional agents containing mineral substance are added, so as to precisely prepare nutrition, and produce functional food rich in selenium, zinc, iron, calcium, iodine and so on.

The descriptions above are merely for specific embodiments of the present disclosure, but the scope of protection of the present disclosure shall not be limited thereto; changes or modifications, which can be easily conceived of by any skilled persons familiarized with the present technical field within the technical scope revealed in the present disclosure, should be covered by the scope of protection of the present disclosure. Therefore, the scope of protection of the present disclosure shall be determined by the scope of protection by the claims.

The invention claimed is:

1. A high-pressure water mist ecological cultivation system, wherein the high-pressure water mist ecological cultivation system comprises:
a nutrient solution supply system assembly, a cultivation rank assembly, and a nutrient solution back-flow system assembly, wherein the nutrient solution supply system assembly comprises a nutrient solution storage tank and pressurizes a nutrient solution from the nutrient solution storage tank and then delivers the nutrient solution to the cultivation rank assembly, the cultivation rank assembly plants and cultivates a crop seedling, and the nutrient solution back-flow system assembly recovers the nutrient solution that is not absorbed by the crop seedling for recycled use, wherein a solution outlet of a high-pressure pump set of the nutrient solution supply system assembly is provided with an overflow valve, and one overflow opening of the overflow valve is connected to the nutrient solution storage tank via a second duct, so as to form a loop, an other exit of the overflow valve is provided with a pressure gauge for observing a pressure, and the overflow valve and the pressure gauge are configured for unloading of the system and control of a pressure of the system, so as to ensure stability of pressure during operation of the system and achieve safety protection of the high-pressure pump set and wherein the cultivation rank assembly is provided with a plurality of cultivation ranks, a bottom of each of the plurality of cultivation ranks is provided with nutrient solution collection openings, the nutrient solution collection openings are respectively provided with corresponding nutrient solution back-flow ducts, each of the nutrient solution back-flow ducts is connected to a back-flow main duct, a nutrient solution collected by the back-flow main duct flows back to a nutrient solution back-flow tank of the nutrient solution back-flow system assembly, and the nutrient solution back-flow tank is connected to the nutrient solution storage tank, for recycled use of the nutrient solution collected by the back-flow main duct.

2. The high-pressure water mist ecological cultivation system according to claim 1, wherein the system is further provided therein with a control cabinet, and the control cabinet is a matching electric control cabinet that supplies power to the system and controls the system, the nutrient solution supply system assembly is provided therein with a plurality of region-partition control valves, the plurality of partition control valves realize control of mist spraying of a plurality of the cultivation ranks in the cultivation rank assembly according to a time period and a region, the cultivation rank is formed by assembling a plurality of basic units, the basic unit includes a base and a supporting rank provided on the base, the supporting rank is in an "A" shape formed by a left slant support, a right slant support and a transverse duct support, wherein the left slant support and the right slant support are joined to one another at one end, and the transverse duct support is transversely installed between the two slant supports, the supporting ranks are provided symmetrically in two, and the two supporting ranks are fixedly connected by a connection support on tops, the left slant supports and the right slant supports of the two supporting ranks are provided thereon with a foam cultivation plate, the base under the foam cultivation plate is provided thereon with a bottom seal formed by a PEP agricultural black-white film, and the bottom seal and the foam cultivation plates on two sides collectively define a mist spraying space for the root of the crop seedling.

3. The high-pressure water mist ecological cultivation system according to claim 1, wherein the nutrient solution supply system assembly is provided therein with a filter, and one exit of the filter is provided with a pressure controller, the pressure controller is used for checking whether the filter is clogged.

4. The high-pressure water mist ecological cultivation system according to claim 1, wherein a nutrient solution back-flow tank of the nutrient solution back-flow system assembly is provided with a liquid level switch, when a liquid level of the nutrient solution back-flow tank rises to a predetermined height, a nutrient solution back-flow pump is initiated, the nutrient solution inside the nutrient solution back-flow tank is pressurized, filtered, disinfected and sterilized via a supplement solution filter and an UV disinfector, and then delivered via a main delivery duct to a nutrient solution storage tank of the nutrient solution supply system assembly for recycled use.

5. The high-pressure water mist ecological cultivation system according to claim 1, wherein the nutrient solution is prepared by adding and evenly mixing the following components by weight in 100 t of water: 95 kg of calcium nitrate, 81 kg of potassium nitrate, 50 kg of magnesium sulfate, 15.5 kg of ammonium biphosphate, 15-25 kg of ferric sodium ethylenediaminetetraacetic acid salt, 0.3 kg of boric acid, 0.2 kg of manganese sulfate, 0.022 kg of zinc sulfate, 0.005 kg of copper sulfate and 0.002 kg of sodium molybdate or ammonium molybdate.

* * * * *